United States Patent
Diamant et al.

(10) Patent No.: US 9,143,931 B2
(45) Date of Patent: *Sep. 22, 2015

(54) PRIVACY CONTROL FOR WIRELESS DEVICES

(71) Applicants: Nimrod Diamant, Kfar Saba (IL); David Gordon, Tel Aviv (IL); Benjamin Getz, Ramat Hasharon (IL)

(72) Inventors: Nimrod Diamant, Kfar Saba (IL); David Gordon, Tel Aviv (IL); Benjamin Getz, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,612

(22) Filed: Dec. 4, 2012

(65) Prior Publication Data

US 2013/0094489 A1    Apr. 18, 2013

Related U.S. Application Data

(63) Continuation of application No. 12/895,352, filed on Sep. 30, 2010, now Pat. No. 8,351,354.

(51) Int. Cl.
| | | |
|---|---|---|
| *H04K 1/00* | (2006.01) | |
| *H04W 12/02* | (2009.01) | |
| *H04W 4/00* | (2009.01) | |
| *H04W 4/02* | (2009.01) | |
| *H04W 8/26* | (2009.01) | |
| *H04W 12/08* | (2009.01) | |
| *H04W 48/16* | (2009.01) | |

(52) U.S. Cl.
CPC .............. *H04W 12/02* (2013.01); *H04W 4/008* (2013.01); *H04W 4/02* (2013.01); *H04W 8/26* (2013.01); *H04W 12/08* (2013.01); *H04W 48/16* (2013.01)

(58) Field of Classification Search
CPC .............................. H04W 12/02; H04W 12/08
USPC ............. 380/258, 209, 270; 713/160; 726/26; 370/338
See application file for complete search history.

(56) References Cited

U.S. PATENT DOCUMENTS 7,266,374 B2    9/2007    Kim
7,359,339 B2    4/2008    Benson et al.
(Continued)

FOREIGN PATENT DOCUMENTS

CN    1638351 A    7/2005
CN    101035046 A    9/2007
(Continued)

OTHER PUBLICATIONS

Xinghua Li, SangJae Moon, and Jianfeng Ma, "On the Security of the Authentication Module of Chinese WLAN Standard Implementation Plan" 2006, pp. 340-348.*

(Continued)

*Primary Examiner* — Samson Lemma
(74) *Attorney, Agent, or Firm* — Pillsbury Winthrop Shaw Pittman LLP

(57) ABSTRACT

According to various embodiments, a computer-implemented method is disclosed that includes receiving, at a wireless adaptor of a device, a wireless data packet from an access point (AP), wherein the wireless data packet includes a Basic Service Set Identifier (BSSID) of the AP; changing the BSSID of the received data packet by a processor or hardware to produce a modified wireless data packet; and transmitting the modified wireless data packet to an application on the device.

21 Claims, 2 Drawing Sheets

(56) References Cited

U.S. PATENT DOCUMENTS

| | | | |
|---|---|---|---|
| 7,839,856 B2 | 11/2010 | Sinha et al. | |
| 7,983,220 B2* | 7/2011 | Kurita et al. | 370/331 |
| 8,189,545 B2 | 5/2012 | Irie et al. | |
| 8,194,586 B2* | 6/2012 | Mizukoshi | 370/328 |
| 2003/0035544 A1* | 2/2003 | Herle et al. | 380/270 |
| 2004/0106415 A1* | 6/2004 | Maeda et al. | 455/456.1 |
| 2005/0135422 A1* | 6/2005 | Yeh | 370/474 |
| 2005/0176420 A1 | 8/2005 | Graves et al. | |
| 2005/0223111 A1 | 10/2005 | Bhandaru et al. | |
| 2006/0256750 A1 | 11/2006 | Van Bemmel | |
| 2006/0274643 A1 | 12/2006 | Choyi | |
| 2006/0280138 A1 | 12/2006 | Nanda et al. | |
| 2007/0064673 A1 | 3/2007 | Bhandaru et al. | |
| 2007/0081477 A1 | 4/2007 | Jakkahalli et al. | |
| 2007/0083470 A1* | 4/2007 | Bonner et al. | 705/51 |
| 2007/0118742 A1 | 5/2007 | Abhishek et al. | |
| 2007/0140188 A1 | 6/2007 | Melkote et al. | |
| 2008/0130579 A1* | 6/2008 | Kurita et al. | 370/331 |
| 2008/0232586 A1* | 9/2008 | Takada et al. | 380/255 |
| 2009/0019539 A1 | 1/2009 | Jonnalagadda et al. | |
| 2009/0100530 A1* | 4/2009 | Chen | 726/29 |
| 2009/0119751 A1 | 5/2009 | Koga | |
| 2009/0136221 A1 | 5/2009 | Nakamura | |
| 2009/0235354 A1 | 9/2009 | Gray et al. | |
| 2010/0266125 A1 | 10/2010 | Tanaka et al. | |
| 2012/0159172 A1* | 6/2012 | Saxena et al. | 713/171 |

FOREIGN PATENT DOCUMENTS

| | | | |
|---|---|---|---|
| EP | 1750464 A1 * | 2/2007 | |
| EP | 1750464 | 5/2012 | |
| JP | 2009089005 | 4/2009 | |
| KR | 2004-0049533 | 6/2004 | |
| TW | 200536409 | 11/2005 | |

OTHER PUBLICATIONS

International Search Report and Written Opinion corresponding to PCT international application No. PCT/US2011/054429, mail date Apr. 10, 2012, total of 9 pages.

European Search Report, Application No. 11830038.3, mail date Dec. 13, 2013, total of 6 pages.

Japanese Office Action, Japanese Application No. 2013-531942, mail date Feb. 25, 2014, total of 4 pages.

Korean Patent Application No. 2013-7008186, The Notice of Preliminary Rejection, mail date Jun. 27, 2014.

Chinese Office Action issued Jun. 17, 2015 in corresponding Chinese Patent Application No. 201180057669.9 (12 pages).

* cited by examiner

PRIVACY CONTROL FOR WIRELESS DEVICES

CROSS-REFERENCE TO RELATED APPLICATIONS

This application is a continuation of U.S. patent application Ser. No. 12/895,352, filed Sep. 30, 2010, the contents of which are hereby incorporated by reference in their entirety.

This disclosure relates generally to the field of wireless communication, and in particular to privacy control for wireless devices.

Sensors, such as location detecting sensors including GPS, are becoming more common in computer devices, especially mobile devices. For example, most new laptops and smart phones include some form of location sensing hardware and/or software that can be used to find a location or approximate location of the device or a location of an access point with which the devices are in communication. Conventionally, local area networks (LANs) and wireless local area networks (WLAN) adaptors such as WiFi receive their IP address from the infrastructure around it.

A WiFi (WLAN) device acquires the identification number (basic service set identifier or BSSID) of access points it sees around it (or associates with) as part of its normal mode of operation. The WiFi access point's BSSID is a unique identifier that can be used to find out the access point's location and thereof also the device's location, especially in mobile platforms. There are already existing services from Skyhook and from Google that provide pretty accurate platform location based on the received access point information. Every WiFi adapter provides, upon a host software request, the BSSID of the associated access point and of other access points around it, as well as other data like signal strength, etc. Based on such data and sometimes using sophisticated triangulation calculation, these Internet servers will provide the client machine (or others) with a high accuracy estimation of the machine's location.

It is easy to understand that given the open nature of today's operating systems, and the wide availability and heavy use of WiFi in mobile platforms, WiFi access point information is easily obtained by every software on the platform, and thus the user's privacy can be violated if software collects and sends such platform sensors' information to unauthorized or uncontrolled destinations. Also, in case such information is openly communicated over the network, it can be seen by others and used to determine and track the user's location. In every mobile platform that incorporates a WLAN adapter, software can access the WLAN driver using standard APIs and get information about the access points that the WLAN card sees.

Given the problems described above, what is needed is an improved mechanism whereby a device, and hence a user's location, can be obscured from software on the platform.

DETAILED DESCRIPTION

Definitions

Figure 1:
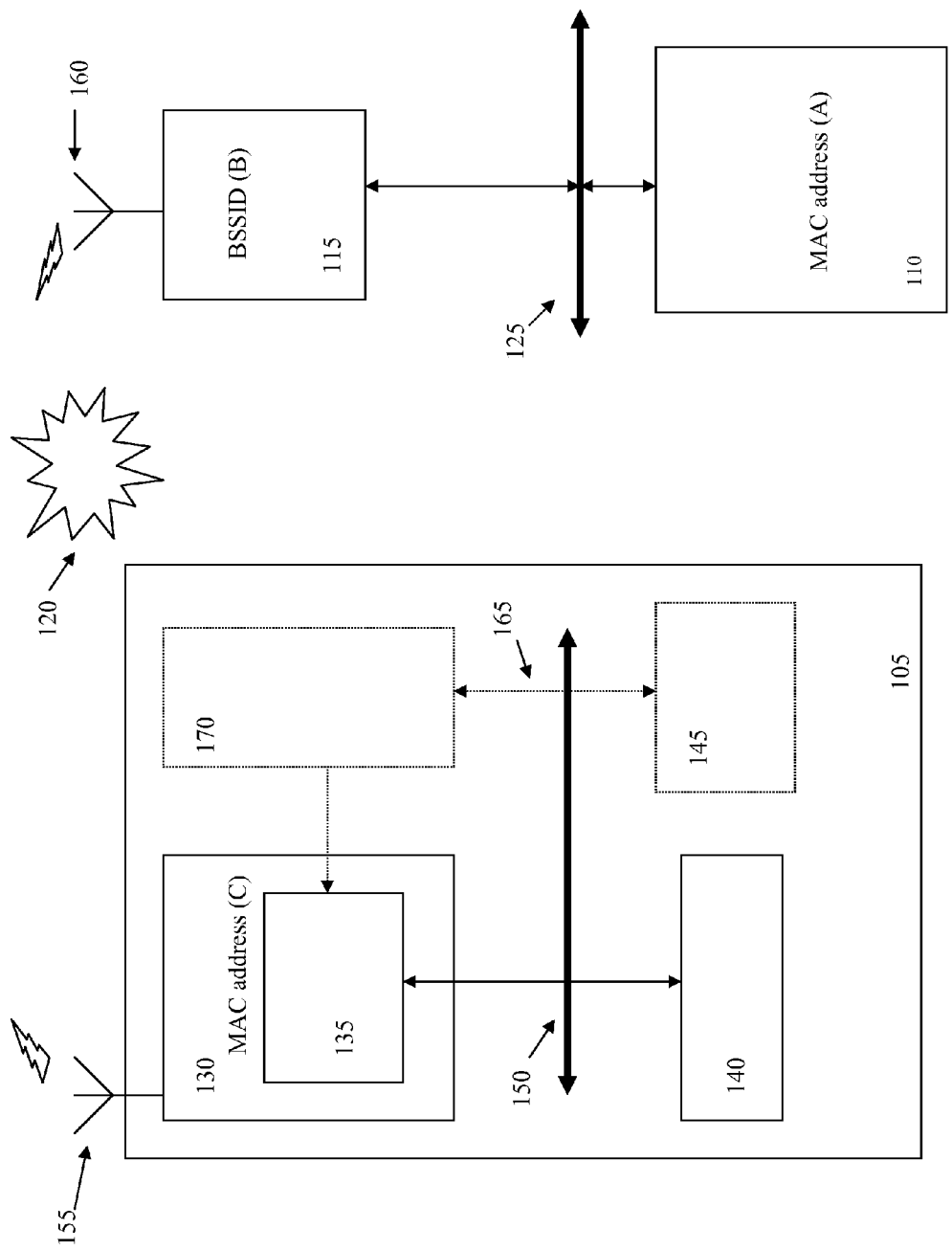
FIG. 1 shows an example system in accordance with various aspects of the present disclosure.

Access Point (AP): Any entity that has a station (STA) functionality and provides access to the distribution services, via the wireless medium (WM) for associated STAs.

Basic service set (BSS): The basic building block of an IEEE 802.11 wireless LAN (according to the IEEE 802.11-1999 standard). In Infrastructure mode, a single access point (AP) together with all associated stations (STAs) is called a BSS. In Independent mode a set of synchronized. STAs, one of which acts as master, forms a BSS. Each BSS is identified by a BSSID. The most basic BSS consists of one AP and one STA.

Basic Service Set Identifier (BSSID): A BSSID uniquely identifies each BSS (the SSID however, can be used in multiple, possibly overlapping, BSSs). In an infrastructure BSS, the BSSID is the MAC address of the wireless access point (WAP). In an IBSS, the BSSID is a locally administered MAC address generated from a 48-bit random number.

Media Access Control (MAC): A Media Access Control (MAC) is a data communication protocol sub-layer, also known as the Medium Access Control, is a sublayer of the Data Link Layer specified in the seven-layer OSI model (layer 2).

Mobile Station (MS): A type of STA that uses network communications while in motion. Station (STA): Any device that contains an IEEE 802.11-conformant medium access control (MAC) and physical layer (PHY) interface to the wireless medium (WM).

Station (STA): Any device that contains an IEEE 802.11-conformant medium access control (MAC) and physical layer (PHY) interface to the wireless medium (WM).

Packet: A basic unit for data transmission between stations.

Wireless medium (WM): The medium used to implement the transfer of protocol data units (PDUs) between peer physical layer (PHY) entities of a wireless local area network (LAN).

Description

In accordance with some aspects of the present disclosure, a computer-implemented method is disclosed that includes receiving, at a wireless adaptor of a device, a wireless data packet from an access point (AP), wherein the wireless data packet includes a Basic Service Set Identifier (BSSID) of the AP; changing the BSSID of the received data packet by a processor to produce a modified wireless data packet; and transmitting the modified wireless data packet to an application on the device.

In some aspects, changing the BSSID can include encrypting the BSSID, scrambling the BSSID, or both. The method can further include receiving a seed value or an encryption key from a controller to change the BSSID, wherein the controller is electrically coupled to the wireless adaptor. The encryption key can include a public encryption key or a private encryption key and the controller can include a manageability engine. In the method, the change of the BSSID can hide an actual BSSID from a software program, an operating system, or both of the device. In the method, the change of the BSSID can allow a location derived from an actual BSSID to be hidden from a software program, an operating system, or both of the device.

In some aspects, the method can include transferring the received BSSID to an authenticated entity in a secured manner, wherein the received BSSID can be used to determine a location of the AP and provide a service related to location but preventing the application or an operating system of the device from assessing the received BSSID data and location data.

In accordance with some aspects of the present disclosure, a computer-implemented method is disclosed that includes receiving, at a wireless adaptor of a device, a wireless data packet including a modified a Basic Service Set Identifier (BSSID) of an access point (AP); changing the modified BSSID of the received wireless data packet by a processor to produce a unmodified wireless data packet; and transmitting the wireless data packet to the AP.

In some aspects the method can include changing the BSSID includes decrypting the BSSID, descrambling the BSSID, or both. Moreover, the method can include receiving a decryption key from a controller to change the BSSID, wherein the controller is electrically coupled to the wireless adaptor. The decryption key can include a public decryption key or a private decryption key and the controller can include a manageability engine. The method can further include receiving a seed value or a decryption key from a controller to initiate the unscrambling of the BSSID.

In accordance with some aspects of the present disclosure, a device is disclosed that includes a wireless adaptor including a processor in communication with a memory having instructions stored therein which, when executed: receive a wireless data packet from an access point (AP), wherein the wireless data packet includes a Basic Service Set Identifier (BSSID) of the AP; change the BSSID of the received data packet to produce a modified wireless data packet; and transmit the modified wireless data packet to an application on the device.

In some aspects, the wireless adaptor can be configured to change the BSSID by encrypting the BSSID, scrambling the BSSID, or both. The device can include a controller configured to provide an encryption key to the wireless adaptor for used in encrypting the BSSID, wherein the controller can include a manageability engine. The wireless adaptor can be configured to separate information derived from an actual BSSID from a software program, an operating system, or both of the device.

Unauthorized software (SW) (or malware) can be loaded onto a computer to access device application programming interfaces (APIs) without a user's knowledge. This SW or malware can reveal information to a malicious user that can later be used to track the computer as well as the location of the user. This access to the location without first getting consent from the user or being part of an application white list that are secure enough to be allowed to access this sensitive info can cause harm to the user.

Given these problems and in accordance with various aspects of the present disclosure, a WiFi AP BSSID can be hidden from an operating system (OS) and general SW applications and be only transferred securely to authentic and approved applications and/or servers. In this respect, location revealing information can be hidden from OS/SW and passed securely to either some secure network server (which can give location based services) or to a secure OS service or application that can then track device location and provide this information only to authenticated apps or usages.

Moreover, other information such as sensor data provided by various sensor devices either connected to or coupled with the user's computer can also be hidden or secured. For example, a standardized API and device driver interface (DDI) that works with the various sensors and their sensor data can be hidden or secured from OS/SW on the user's computer. Sensors can come in many configurations including both hardware devices and software. For example, logical sensors can provide information through emulation of sensor functionality in software or firmware. Also, a single hardware device can contain multiple sensors. The various sensors can include location sensors, such as GPS devices. Other types of sensors can be software based, such as an IP resolver that provides location information based on an Internet address, a mobile phone tower triangulator, such as in a cellular network, that determines location based on nearby towers, or a Wi-Fi network location provider that reads location information from the connected wireless network hub.

In accordance with various aspects of the present disclosure, actual (unscrambled) access points BSSID data can be altered so that software, whether intentionally or unintentionally loaded onto a user's device, can not determine the BSSID data. For example, a wireless adaptor, such as a WLAN hardware or WLAN host driver, can alter, such as by scrambling or encrypting, the BSSIDs that is provided to software operating on the device. Once this scrambling algorithm is enabled, the software will receive a false (scrambled) BSSIDs picture so that in an attempt to send this data to web servers to resolve the device's location, an erroneous location or no location would result. With user control over that capability, location can be exposed to all applications or to no application or to limited/selected applications.

In some aspects, control over the wireless adapter, such as a WLAN card hardware, can also be done securely by an out-of-band signal from a trusted platform entity or a hardware/software controller, i.e., but not limited to, a Manageability Engine (ME) or a WLAN OS driver. In such cases, user control can be performed at a BIOS level (pre OS) or through secured input/output of the ME, or through a trusted web site that can send user's instructions signed and encrypted to ME.

When the user wants to provide his platform location in a secured way to a specific service provider, a trusted entity like the ME can access the WLAN BSSID information out-of-band (OOB) through a control bus, such as ME C-link control bus. ME can provide to the WLAN controls for this capability (enable/disable) as well as per platform unique random scrambling/unscrambling key generation and/or storage for the BSSIDs translation from the real actual numbers to the scrambled numbers exposed to the device. The WLAN card can implement a scrambling/unscrambling algorithm or use a real BSSID to scrambled BSSID translation or look-up table that pairs an actual BSSID with an equivalent scrambled BSSID.

When privacy mode is enabled, the device through, for example, a wireless adapter, can detect actual access points and replace the actual BSSID of the actual access points with a scrambled BSSID based on the scrambling algorithm. The scrambled BSSID, and not the actual BSSID, can then be exposed to the device's software. This process can be performed on a packet by packet basis. Similarly, when the device transmits a wireless data packet, the wireless adaptor can replace the scrambled BSSID that comes from the device driver with the actual, physical BSSID. When the controller or ME is used and the user wants to send his 'location' information to a trusted destination, the controller or ME can access the actual access point BSSID data through an out-of-band (OOB) control bus, such as ME C-link, connection to the wireless adaptor and can transfer it encrypted and signed over secured communication channel to a trusted receiving entity.

Turning now to the figures, FIG. 1 shows an example system in accordance with various aspects of the present disclosure. Device 105 is shown communicating with device 110 through access point 115 over wireless medium 120. Devices 105 and 110 have their own MAC address. For illustration only, the MAC address of device 105 will be labeled "MAC address (C)," the MAC address of device 110 will be labeled "MAC address (A)" and access point 115 will have a BSSID ID labeled "BSSID (B)."

Devices 105 and 110 can be STAs or MS and can include computers such as a desktop, laptop, or smart phone. Device 105 can include wireless adaptor 130 such as WiFi adapter having a MAC address. Device 105 can also include BSSID scrambling algorithm 135 communicating with OS WLAN stack and applications 140 over bus 150, such as a PCI bus. Transceiver 155 can be electrically coupled to and controlled by wireless adapter 130 and can communication with access point 115 and device 110 over wireless medium 120.

Access point 115 can communicate with device 110 through network 125, such as a LAN. Transceiver 160 can be electrically coupled to and controlled by access point 115 and can communication with device 105 and/or device 110 over wireless medium 120 and with device 110 over network 125.

BSSID scrambling algorithm 135 can be arranged to mask, translate, scramble or encrypt BSSID of access point 115 using a variety of techniques, such as those techniques that would be appreciate by those of ordinary skill in the art. As used herein, the word "scramble" or "unscramble" will be general term for the various methods in which the BSSID can be altered as described herein.

For example, the BSSID can be replaced with a similar, but unused or unrelated. BSSID, such that the BSSID of access point 115 is not identical with the replacement BSSID. The replacement BSSID can effectively mask or hide the actual BSSID from applications running on device 105. The BSSID can also be scrambled using algorithms other than cryptographic algorithms.

Moreover, if the BSSID is encrypted/decrypted, a symmetric or asymmetric cryptographic algorithm may be used. By way of example, but not limited to, symmetric cryptographic algorithms that can be used include Advanced Encryption Standard (AES) and Data Encryption Standard (DES). Other types of symmetric algorithms may also be used. Moreover, the types of asymmetric cryptographic algorithms that may be used include, but not limited to, public key encryption including RSA cryptography.

In some aspects, device 105 can also include a controller 170 (shown in dotted line) such as a Manageability Engine (ME) that is configured to communicate with BSSID scrambling algorithm 135 stored within a memory of wireless adaptor 130. Controller 170 can provide a seed or encryption key and/or a look-up table for the WLAN BSSID translator. Controller 170 can also communicate with applications 145 (shown in dotted line) over interface 150 (shown in dotted line), such as a host-to-embedded controller interface (HECI). Applications 145 are configured to access the secured scrambled BSSID from controller 170 to be used by within device 105 or by another device in secured communication with device 105. The scrambled BSSID can be made available by a user's consent.

Figure 2:
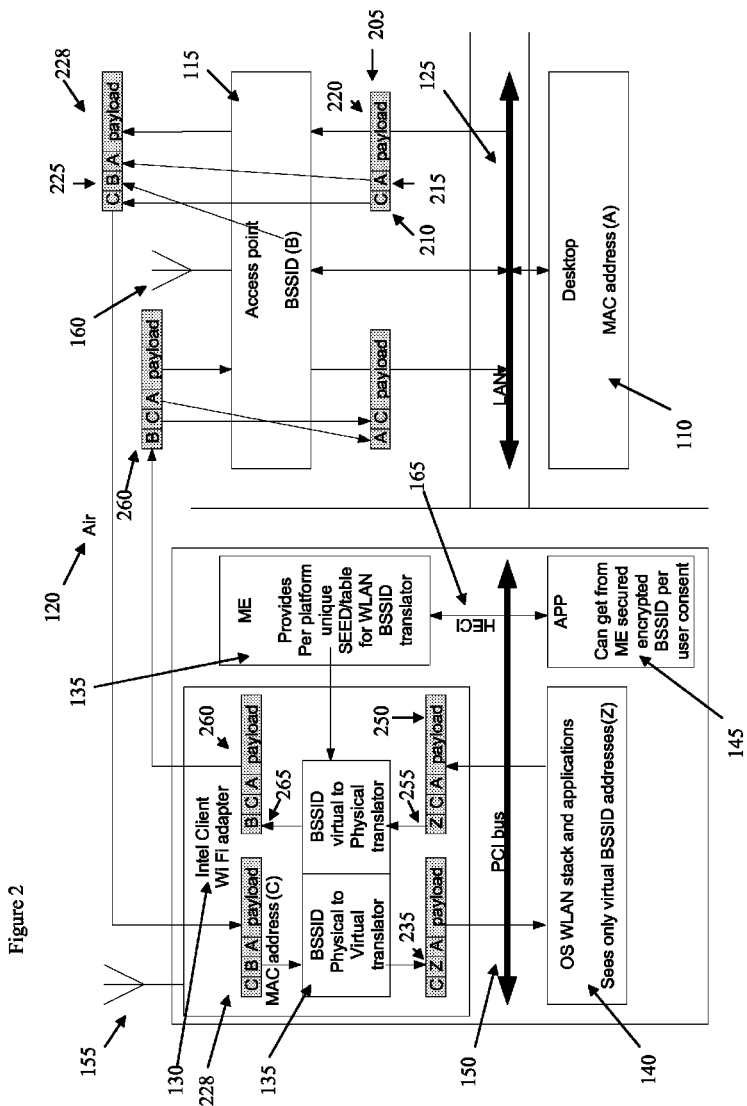
FIG. 2 shows an example method for communicating between devices of the system of FIG. 1.

FIG. 2 shows an example data flow between device 110 and 105. The data flow from device 110 to device 105 will first be described. Device 110 assembles and transmits data packet 205 to access point 115 through network 125. Data packet 205 includes a destination header information 210, for example "C" as shown in the figure, relating to a destination of the wireless packet, a source header information 215, for example "A" as shown in the figure, relating to a source of the wireless packet. Headers 210 and 215 are assembled with the payload data 220, for example "payload" as shown in the figure, into data packet 205. Access point 115 appends its BSSID 225 or "BSSID (B)" to data packet between headers 210 and 215. Data packet 228 is transmitted over wireless medium 120 to device 105. Transceiver 155 receives the transmitted data packet 228 and communicates data packet 228 to wireless adaptor 130. Wireless adaptor 130 disassembles data packet 228 and converts the BSSID of access point 115 to a scrambled BSSID 235 of access point 115 using the scrambling algorithm. Payload data of scrambled data packet can be communicated to OS WLAN stack and applications 140 over bus 150, such that the scrambled BSSID 235 and not the actual BSSID 225 is detectable by OS WLAN stack and applications 140.

In some aspects, when controller 135 is used, controller 135 can provide, for example, a unique SEED or encryption key and/or a look-up table for WLAN BSSID translator. Applications 145 can then access from controller 135 a secured encrypted BSSID based upon a user's consent over interface 150.

Communicating from device 105 to device 115 will now be described. OS WLAN stack and applications 140 communicates payload data 250, for example "payload" as shown in the figure, to wireless adaptor 130. Wireless adaptor 130 receives payload data 250 and unscrambles the scrambled. BSSID 255 using scrambling algorithm. Unscrambled data packet 260 including unscrambled BSSID 265 is assembled at wireless adaptor 130 and transmitted by transceiver 155. Transceiver 160 of access point 110 receives data packet 260. Access point 110 transmits payload data 260 to device 115 over network 125.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Although the above examples mostly pertain to WiFi APIs, this disclosure is so limited. As discussed above, other sensor APIs are intended to be encompassed with this disclosure.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A device comprising:
  a processor in communication with a memory having instructions stored therein which, when executed, cause the processor to:
    receive a wireless data packet from an access point (AP), wherein the wireless data packet includes a Basic Service Set Identifier (BSSID) of the AP;
    encrypt the BSSID of the received data packet using an encryption key, the encryption key including a public encryption key or a private encryption key, to produce a modified wireless data packet including the encrypted BSSID; and provide the modified wireless data packet including the encrypted BSSID to an application executing on the device, wherein the BSSID is hidden from the application.

2. The device of claim 1, wherein the instructions stored in the memory, when executed, further cause the processor to receive a seed value or the encryption key from a controller to encrypt the BSSID.

3. The device of claim 2, further comprising the controller, wherein the controller includes a manageability engine.

4. The device of claim 1, wherein the encryption of the BSSID hides an actual BSSID from a software program, an operating system, or both of the device.

5. The device of claim 1, wherein the encryption of the BSSID allows a location derived from an actual BSSID to be hidden from a software program, an operating system, or both of the device.

6. The device of claim 1, wherein the instructions stored in the memory, when executed, further cause the processor to transfer the received BSSID to an authenticated entity in a secured manner, wherein the received BSSID is used to determine a location of the AP and provide a service related to location but prevent the application or an operating system of the device from assessing the received BSSID data and location data.

7. A device comprising:
a processor in communication with a memory having instructions stored therein which, when executed, cause the processor to:
receive, from an application on the device, a wireless data packet including a modified Basic Service Set Identifier (BSSID) of an access point (AP);
decrypt the BSSID using an decryption key, the decryption key including a public decryption key or a private decryption key, to change the modified BSSID of the received wireless data packet to an original BSSID of the AP to produce a unmodified wireless data packet, wherein the original BSSID is hidden from the application; and
transmit the unmodified wireless data packet to the AP.

8. The device of claim 7, wherein the instructions stored in the memory, when executed, further cause the processor to receive the decryption key from a controller to change the BSSID.

9. The device of claim 8, further comprising the controller, wherein the controller includes a manageability engine.

10. The device of claim 7, wherein the instructions stored in the memory, when executed, further cause the processor to receive a seed value from a controller to initiate the decrypting of the BSSID.

11. The device of claim 10, further comprising the controller, wherein the controller includes a manageability engine.

12. A computer-implemented method comprising:
receiving, at a hardware processor of a device, a wireless data packet from an access point (AP), wherein the wireless data packet includes a Basic Service Set Identifier (BSSID) of the AP;
encrypting, at the hardware processor, the BSSID of the received data packet using an encryption key, the encryption key including a public encryption key or a private encryption key, to produce a modified wireless data packet including the encrypted BSSID; and
providing the modified wireless data packet including the encrypted BSSID to an application on the device, wherein the BSSID is hidden from the application.

13. The method of claim 12, further comprising providing the encryption key from a controller of the device to the processor to encrypt the BSSID.

14. The method of claim 12, wherein said encrypting the BSSID separates information derived from an actual BSSID from a software program, an operating system, or both of the device.

15. A non-transitory computer-readable medium holding computer-executable instructions thereon, the computer-executable instructions, when executed by a processor of a device, cause the processor to perform a method, the method comprising:
receiving a wireless data packet from an access point (AP), wherein the wireless data packet includes a Basic Service Set Identifier (BSSID) of the AP;
encrypting the BSSID of the received data packet using an encryption key, the encryption key including a public encryption key or a private encryption key, to produce a modified wireless data packet including the encrypted BSSID; and
providing the modified wireless data packet including the encrypted BSSID to an application on the device, wherein the BSSID is hidden from the application.

16. The medium of claim 15, wherein the method further comprises receiving a seed value or the encryption key from a controller to encrypt the BSSID.

17. The medium of claim 15, wherein said encrypting the BSSID results in hiding an actual BSSID from a software program, an operating system, or both of the device.

18. The medium of claim 15, wherein the method further comprises transferring the received BSSID to an authenticated entity in a secured manner, wherein the received BSSID is used to determine a location of the AP and provide a service related to location but prevent the application or an operating system of the device from assessing the received BSSID data and location data.

19. A non-transitory computer-readable medium holding computer-executable instructions thereon, the computer-executable instructions, when executed by a processor of a device, cause the processor to perform a method, the method comprising:
receiving, from an application on the device, a wireless data packet including a modified a Basic Service Set Identifier (BSSID) of an access point (AP);
decrypting the modified BSSID of the received wireless data packet to an original BSSID of the AP using an decryption key, the decryption key including a public decryption key or a private decryption key, to produce a unmodified wireless data packet, wherein the original BSSID is hidden from the application; and
transmitting the unmodified wireless data packet to the AP.

20. The medium of claim 19, wherein the method further comprises receiving the decryption key from a controller to change the BSSID.

21. The medium of claim 19, wherein the method further comprises receiving a seed value from a controller to initiate the decrypting of the BS.

* * * * *